United States Patent [19]

Takeshita

[11] Patent Number: 4,468,958
[45] Date of Patent: Sep. 4, 1984

[54] CONTROL SYSTEM FOR AN AUTOMATIC TRANSMISSION TESTING DEVICE

[75] Inventor: Hiroshi Takeshita, Kobe, Japan

[73] Assignee: Mitsubishi Denki Kabushiki Kaisha, Tokyo, Japan

[21] Appl. No.: 412,099

[22] Filed: Aug. 27, 1982

[30] Foreign Application Priority Data

Aug. 31, 1981 [JP] Japan .................................. 56-137323

[51] Int. Cl.³ .......................................... G01M 13/02
[52] U.S. Cl. .................................................. 73/118
[58] Field of Search ........................... 73/118, 162, 862

[56] References Cited

U.S. PATENT DOCUMENTS 3,922,910 12/1975 Dickinson .......................... 73/162 X

FOREIGN PATENT DOCUMENTS 627369 10/1978 U.S.S.R. .................................. 73/118
742741 6/1980 U.S.S.R. .................................. 73/118

Primary Examiner—Gerald Goldberg
Assistant Examiner—Brian Tumm
Attorney, Agent, or Firm—Leydig, Voit, Osann, Mayer & Holt

[57] ABSTRACT

The present invention relates to a control system for a testing device for the automatic transmissions used in automobiles, and comprises a torque controlling feedback loop for controlling the torque applied to the input shaft of the transmission under test, and a speed controlling feedback loop for controlling the speed of the output shaft of the transmission under test, whereby the circumstances in an actual automobile application can be accurately and easily simulated to allow realistic testing of the automatic transmission.

1 Claim, 2 Drawing Figures

CONTROL SYSTEM FOR AN AUTOMATIC TRANSMISSION TESTING DEVICE

BACKGROUND OF THE INVENTION

This invention relates to a control system for a testing device for the automatic transmissions used in automobiles and the like, and in particular relates to a control system for an automatic transmission testing device that enables the automatic transmission to be subjected to drive and load conditions that substantially simulate the conditions encountered in an actual automobile.

In prior automatic transmission testing devices, the speed of the driven side, i.e. the input shaft of the transmission under test, was controlled, while a flywheel accelerated or decelerated by an electric motor acted as a load on the output shaft of the transmission. The drive torque, accordingly, was determined by the speed of the change in the speed reference or control signal. In other words, the drive torque depended on the acceleration or deceleration time setting. Thus, the accuracy of the torque setting on the input shaft side was poor, and the setting could not be varied with accuracy. Further, at the shift point, an important parameter of automatic transmission performance, the rotational speed of the input shaft changes substantially within a very brief space of time, but being under speed control, it reverts to the specified speed (that at which the shift occurred), making it impossible to easily maintain the output shaft at the speed required for measurement.

SUMMARY OF THE INVENTION

It is an object of the present invention to eliminate the aforementioned detects of the prior art, and to present a control system for an automatic transmission testing device that enables accurate simulation of the drive and load states encountered in an actual automobile application, regardless of any gear shift-induced change in the gear ratio of the automatic transmission. These and other objects are achieved by presenting a control system for an automatic transmission testing device wherein the driven side, i.e. the input shaft side of the test transmission, is subject to torque control by a torque control feedback loop, and the drive side, i.e. the output shaft side of the transmission, is subject to speed control by a speed control feedback loop.

BRIEF DESCRIPTION OF THE DRAWINGS

In the drawings, like reference numerals denote like or corresponding parts.

DETAILED DESCRIPTION OF THE PREFERRED EMBODIMENTS

Figure 1:
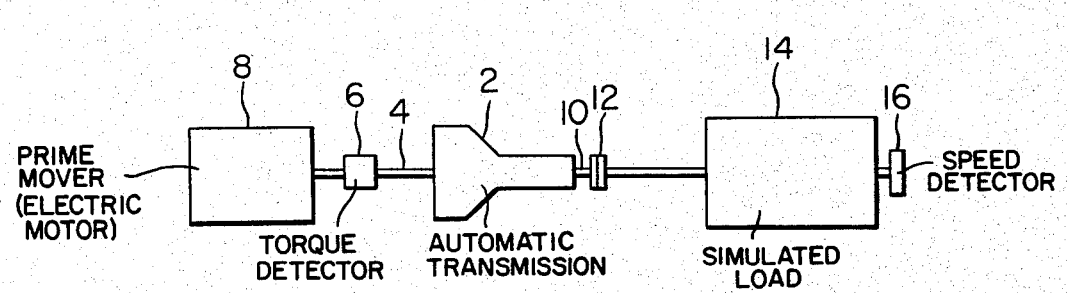
FIG. 1 shows a schematic diagram of an automatic transmission testing device such as that to which the present invention may be applied.

Referring to FIG. 1, wherein is shown a schematic diagram of an automatic transmission testing device such as that to which the present invention may be applied, an automatic transmission 2 to be tested is mounted in the testing device with the input shaft thereof coupled to a prime mover 8 such as an electric motor, and with an input side torque detector 6 associated with the coupling. The output shaft 10, corresponding to the drive side in an actual automobile application, is coupled via any suitable known means 12 to a simulated load 14, which may comprise an AC or a DC motor, or the like, with or without a flywheel ballast. The simulated load 14 is suitably associated with a speed detector 16.

Figure 2:
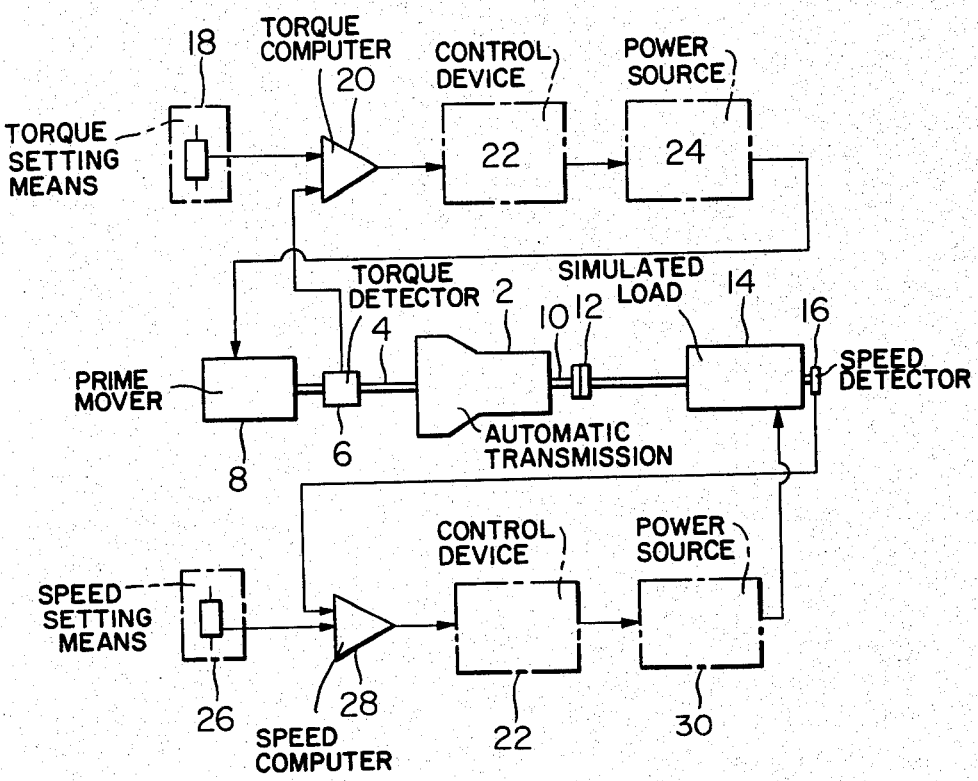
FIG. 2 shows a block diagram of the control system of the present invention.

Referring now to FIG. 2, wherein is shown a block diagram of a control system for an automatic transmission testing device according to this invention, the torque detector 6 which detects the torque being applied at the input shaft 4 of the test transmission 2, feeds a torque detection signal to a torque computer 20 which compares the actual torque signal with a reference torque signal from a torque setting means 18, to provide a torque control signal which is fed via a control device 22 to a power source 24, whence it controls the prime mover 8, in a straight-forward torque control feedback loop.

At the other end of the transmission, the drive or output shaft end of the transmission, the speed detector 16 associated with the simulated load 14 feeds a drive side speed detection signal to a speed computer 28 which compares the actual speed signal with a reference speed signal from a speed setting means 26, to provide a speed control signal which is fed via a control device 22 to a power source 30, whence it controls the simulated load 14, in a straight-forward speed control feedback loop.

In operation, the control system causes the torque value selected by the torque setting means 18 to be applied to the input shaft 4 of the automatic transmission 2 under test, whereby the transmission 2 functions to cause the speed of the output shaft 10 thereof (and hence the simulated load 14) to rise (or fall, in accordance with the sense of the torque). When the speed of the output shaft 10 reaches a shift point as determined by the design parameters of the automatic transmission, the gear shift is executed, and the gear ratio, i.e. the ratio of the speeds of the input and output shafts is changed, such that the speed of the input shaft 4 falls (or rises), while the speed of the output shaft 10 is controlled to be maintained substantially constant, in simulation of the circumstances that would occur in an actual automobile application. Accordingly, by controlling the speed of the simulated load 14 (the output shaft 10) by means of a constant speed reference signal at the shift point, the prime mover 8 (input shaft 4) will be driven at a speed determined by the relationship between the speed of the simulated load 14 and the gear ratio selected, even when that ratio changes abruptly. Thus it is possible to confirm the shift points and to make any required measurements both accurately and easily, in substantially complete simulation of an actual automobile application.

Additionally, it is possible to vary the simulated conditions to simulate any combination of such factors as vehicle load and weight, rolling resistance, wind resistance, and road surface inclination, etc., by adjusting the control of the simulated load 14. Further, the torque reference value can be varied in any way to simulate the throttle opening in an actual automobile.

What is claimed is:

1. A control system for a testing device for automatic transmissions, including a prime mover torque source to supply torque to the input shaft of an automatic transmission under test, and a simulated load to subject to load the output shaft of said automatic transmission, to simulate the operating conditions of an actual automobile, comprising:

an input shaft side torque controlling feedback loop including a torque reference signal producing means which provides a torque reference signal for controlling the torque applied to the input shaft of said test transmission by said prime mover torque source, a torque detector which produces an actual torque signal corresponding to the actual torque being applied to the input shaft of said test transmission by said prime mover torque source, and a torque computer which compares said torque reference signal and said actual torque signal to control the torque applied to said input shaft of said test transmission at a value determined by said torque reference signal producing means; and an output shaft side speed controlling feedback loop including a speed reference signal producing means which provides a speed reference signal for controlling the speed of the output shaft of said test transmission by means of said simulated load, a speed detector which produces an actual speed signal corresponding to the actual speed of said output shaft of said test transmission, and a speed computer which compares said speed reference signal and said actual speed signal to control the speed of the output shaft of said test transmission by means of said simulated load, whereby the speed of the output shaft of said test transmission is maintained substantially constant at a gear shift point, in simulation of the actual circumstances of an actual automobile application, regardless of the change in speed of the prime mover torque source that results from the different gear ratios before and after the gear shift.

* * * * *